J. T. RAINER.
PEANUT DIGGING ATTACHMENT.
APPLICATION FILED APR. 30, 1918.

1,277,120.

Patented Aug. 27, 1918.

INVENTOR.
J. T. RAINER.
BY
ATTORNEY.

UNITED STATES PATENT OFFICE.

JOHN T. RAINER, OF GRAPELAND, TEXAS.

PEANUT-DIGGING ATTACHMENT.

1,277,120.  Specification of Letters Patent.  Patented Aug. 27, 1918.

Application filed April 30, 1918. Serial No. 231,694.

*To all whom it may concern:*

Be it known that I, JOHN T. RAINER, a citizen of the United States, residing at Grapeland, in the county of Houston and State of Texas, have invented certain new and useful Improvements in Peanut-Digging Attachments, of which the following is a specification.

This invention relates to new and useful improvements in peanut diggers. The idea is to provide an attachment which may be secured to an ordinary cultivator or double shovel plow so as to stand transversely of the row and dig in and under the plants as the implement is moved along the row. The attachment is set deep enough to cut the tap roots whereby the peanuts are not injured and are left exposed on top of the row.

In carrying out the invention I provide a combined digging and cutting bar which is shaped and formed so as to be disposed at an angle of inclination to the horizontal when attached to the implement and is also provided with an arcuate cutting edge so as to enter the row transversely and cut through the same, at the same time tending to elevate and discharge over its rear upper edge the plants and the peanuts. The bar is formed with apertures or other means at each end for securing it to the feet of the agricultural implement and it is designed to be quickly attached by simply removing the usual shovels and fastening with the usual heel bolt.

In a more specific embodiment of the invention an arcuate bar is produced and provided with an arcuate cutting edge. At each end the bar is turned upward sharply and provided with laterally directed ears having apertures for receiving heel bolts. The ears are disposed in such angular relation to the body of the bar as to support the device on an agricultural implement at the proper inclination, which requires that the ears be twisted or disposed at an angle to the body of the bar.

The invention will be more readily understood from a reading of the following specification and by reference to the accompanying drawings, in which an example of the invention is illustrated, and wherein—

Figure 1:
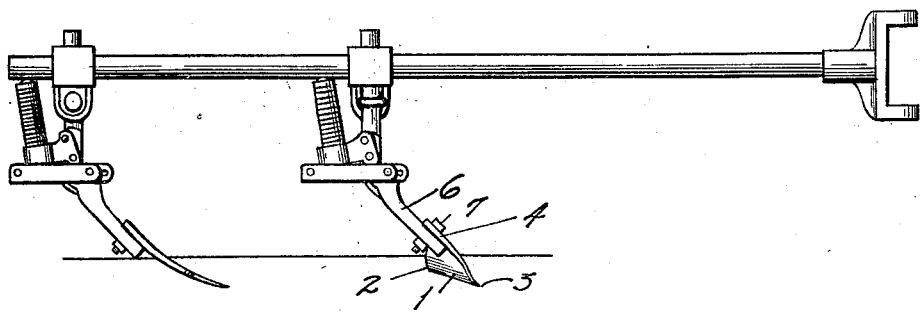
Figure 2:
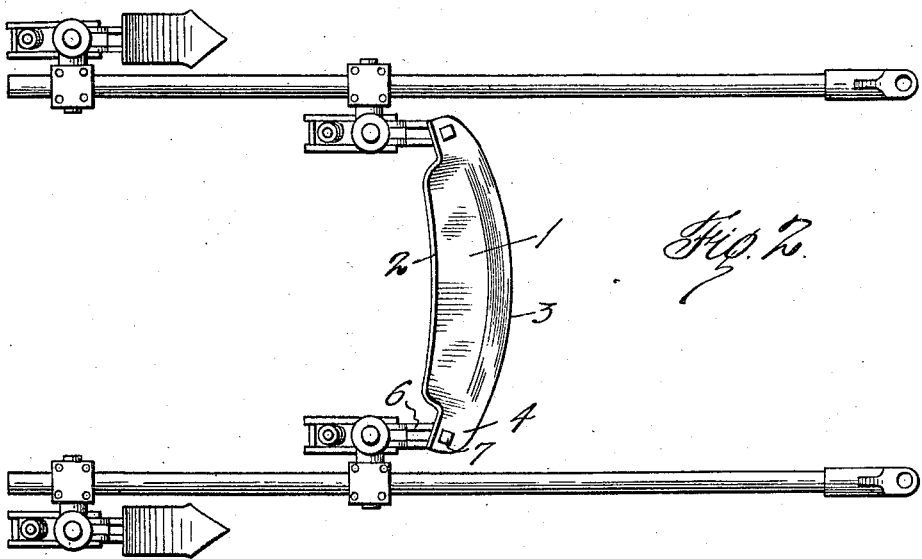
Figure 3:
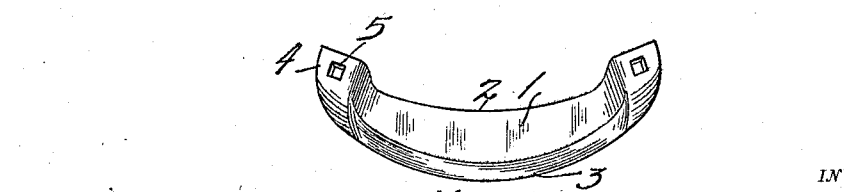

Figure 1 is a side elevation of a pair of cultivator gangs showing the attachment fastened on the front or inner feet, Fig. 2 is a plan view of the same, and Fig. 3 is a front elevation of the digger as it appears when fastened on the agricultural implement, the parts of which latter are not shown.

In the drawings the numeral 1 designates a digger bar which has a rear curved upper edge 2 and a front curved lower cutting edge 3. The curve of the rear edge has a greater radius than the curve of the cutting edge, whereby the latter is more pronounced and the bar is given its curved width at its center and is reduced in width toward each end. The bar is also dished or curved downward longitudinally.

At each end the bar is twisted and bent sharply upward to provide ears 4 each of which has an aperture 5 for receiving a heel bolt 7. The ears are disposed at a greater inclination than the body of the bar whereby their front edges merge into the cutting edge 3 and their rear edges are elevated some distance above the edge 2. This results in the formation and shape such as is clearly shown in Figs. 2 and 3.

One of the salient features of this attachment is its simplicity, both in structure and its manner of attachment to the agricultural implement. It is to be understood that the attachment may be applied to a riding cultivator or a walking cultivator and also to a double shovel plow stock. When applied to the plow the feet must be adjusted to aline transversely of the row which every farmer knows how to do and needs no illustration. In applying an attachment to a cultivator the shovels are removed from the front or inner feet 6 and the bar 1 placed between said feet so that the ears 4 rest on the same. An ordinary heel bolt 7 is placed in each aperture 5 and fastened to the foot 6 supporting its respective ear. The implement is now ready for use. The bar 1 enters the row and the feet 6 pass along each side. It will be seen that the bar extends between the two feet at an angle of inclination somewhat the same as the ordinary shovel and is curved or dished transversely of the row and at the same time presents a curved cutting edge having its curved projection at the center of the bar so that the latter will more readily sever the tap roots and pass under the plants with less resistance. The rear edge 2 being somewhat higher than the cutting edge 3 it is obvious that the plants and peanuts will ride up over the inclined face of the bar and be discharged from the edge 2 whereby the peanuts will be brought to the surface and exposed. The device is quickly attached or removed and has been found to do the work with the highest efficiency.

When the peanuts and plants are plowed up they will be left without dirt on the same, and thus by the time a row is plowed the vines will be wilted. Handling the land in this way leaves the soil in first class condition and is good cultivation. By mounting the bar on feet provided with spring strips it will not be injured on striking a stump as it will break back the same the cultivator shovels would.

The foregoing description and illustration clearly express the invention, but it is to be understood that said illustration is merely an exemplification and the invention may be carried out in various ways.

What I claim is:—

1. A peanut digger comprising a longitudinal bar curved in two directions and having an arcuate cutting edge, and ears at each end of the bar bent sharply from the same and disposed at a greater inclination than the bar, said ears having provision for attaching to an agricultural implement.

2. The combination with transverse alined feet of an agricultural implement traveling on opposite sides of the row, of a peanut digging bar curved longitudinally and extending between the feet of the agricultural implement, said bar having ears at each end disposed at a greater inclination than its body and resting on the feet of the implement, and heel bolts fastening the ears in place, the said bar being curved downward toward its center from each ear and having a forwardly projecting cutting edge, the rear edge of the bar being higher than the cutting edge.

In testimony whereof I affix my signature.

JOHN T. RAINER.

Copies of this patent may be obtained for five cents each, by addressing the "Commissioner of Patents, Washington, D. C."